(12) United States Patent
Di Benedetto et al.

(10) Patent No.: US 7,424,533 B1
(45) Date of Patent: Sep. 9, 2008

(54) METHOD AND APPARATUS FOR ROLE-BASED ACCESS CONTROL

(75) Inventors: Marco Di Benedetto, San Jose, CA (US); Fabio Maino, Palo Alto, CA (US); Chandan Mishra, Campbell, CA (US); Thomas John Nosella, San Jose, CA (US); Ankur Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 841 days.

(21) Appl. No.: 10/444,718

(22) Filed: May 23, 2003

(51) Int. Cl.
*G06F 15/173* (2006.01)
*G06F 15/177* (2006.01)

(52) U.S. Cl. .................... 709/226; 709/220
(58) Field of Classification Search ........... 709/238, 709/225, 226, 229; 707/205
See application file for complete search history.

(56) References Cited

U.S. PATENT DOCUMENTS

| | | | | |
|---|---|---|---|---|
| 6,574,736 B1* | 6/2003 | Andrews | .................... | 709/227 |
| 6,845,387 B1* | 1/2005 | Prestas et al. | ............... | 709/203 |
| 2003/0118053 A1 | 6/2003 | Edsall et al. | | |
| 2004/0215749 A1* | 10/2004 | Tsao | ........................... | 709/220 |
| 2007/0067366 A1* | 3/2007 | Landis | ....................... | 707/205 |

OTHER PUBLICATIONS

Nyanchama, M., Osborn, S. (1994) Access Rights Administration in Role-Based Security Systems. Proc. IFIP WG 11.3 Database Security, 1994. In: Database Security VIII, Status and Prospects (J. Biskup, M. Morgenstern, C. E. Landwehr, Eds). North Holland (Elsevier) (pp. 1-23).*
Cisco Systems, "Cisco SAN-OS", 1992-2003 Cisco Systems, Inc. pp. 1-7.
Cisco Systems, "Cisco MDS 9000 Family of Multilayer Directors and Fabric Switches", 1992-2003 Cisco Systems, Inc., pp. 1-4.
Cisco MDS 9000 Family SAN OS 2.0(X) data sheet, 2004, 11 pp.

* cited by examiner

*Primary Examiner*—Paul H Kang
(74) *Attorney, Agent, or Firm*—Weaver Austin Villeneuve & Sampson LLP

(57) ABSTRACT

Methods and devices are provided for role-based access control of network devices. The network devices may constitute the fabric of a storage area network ("SAN") that has been logically partitioned into virtual storage area networks ("VSANs") that are allocated to various administrators. Roles assigned according to preferred aspects of the invention do not need to be hierarchical, but are customized according to administrators' needs.

27 Claims, 10 Drawing Sheets

| | VSAN | | | Network Objects | Storage Objects | | |
|---|---|---|---|---|---|---|---|
| | 515 Show | 520 FSPF | 525 Zone | 530 FCDOMAIN | 535 01 | 540 02 | 545 03 |
| Admin | ✓ | ✓ | ✓ | ✓ | ✓ | | |
| FSPF Admin | ✓ | ✓ | | | | ✓ | |
| Zone Admin | ✓ | | ✓ | | | | ✓ |
| Operator | ✓ | | | | | | ✓ |
| Customized Role 570 | | ✓ | | ✓ | ✓ | | |
| Customized Role 575 | ✓ | ✓ | ✓ | | | ✓ | ✓ |

| | VSAN | | | Network Objects 505 | | Storage Objects 510 | |
|---|---|---|---|---|---|---|---|
| | Show 515 | FSPF 520 | Zone 525 | | FCDOMAIN 530 | O1 535 | O2 540 | O3 545 |
| Admin | ✓ | ✓ | ✓ | | ✓ | ✓ | | |
| FSPF Admin | ✓ | ✓ | | | | | | |
| Zone Admin | ✓ | | ✓ | | | | | |
| Operator | ✓ | | | | | ✓ | ✓ | |
| Customized Role 570 | ✓ | ✓ | ✓ | | ✓ | ✓ | ✓ | ✓ |
| Customized Role 575 | ✓ | | | | | | | ✓ |

FIG. 5

| | | | |
|---|---|---|---|
| Administrator 1 | | FSPF Admin | |
| Administrator 2 | | FSPF Admin | Zone Admin |

METHOD AND APPARATUS FOR ROLE-BASED ACCESS CONTROL

BACKGROUND OF THE INVENTION

This invention pertains generally to network devices and more particularly to granting privileges for the configuration of network devices.

Existing methods for granting privileges for the configuration of network devices have certain limitations. Currently, different levels for privileges are granted to groups of administrators, each group having a common password. One example of such an arrangement is depicted in FIG. 1. Administrators that have permission to use basic command group 101 may be able to use a few commands regarding basic management of a fabric network devices. All those who are involved with the day-to-day management of that device will be given a password appropriate for this basic level. Using the password, these people will be able to invoke the commands of command group 101.

A more restricted number of administrators will know the password for "enable" command group 102, which will allow additional commands, e.g., for the configuration of a fabric network devices. All those with permission to use the commands of command group 102 will also be able to use the commands of command group 101.

An even smaller number of engineers may have the password for an "engineering" command group 103. The engineering group may be sent by a vendor, such as Cisco Systems or the present assignee, to perform special operations such as debugging, etc. All those with permission to use the commands of command group 103 will also be able to use the commands of command groups 101 and 102.

Currently-implemented systems such as the one described above do not provide for keeping a record of what individual administrator performed operations on a particular network device at a particular time. For example, if a particular administrator to whom "enable" status is granted had configured a network device on a particular day, there might be a record that a person having that status had configured the network device on that day. However, there would be no indication of what administrator had made such changes.

The present assignee has developed methods and devices for logically segregating a single physical network into virtual networks. VSANs allow a single fabric of network devices to support and segregate the operations of multiple customers. For example, customer A may be able to access data in certain storage devices connected to the network, whereas customer B may not.

If multiple customers are seeking to administer and configure the same fabric nodes of a particular storage area network, complications may arise. For example, different customers may seek to configure the same device in different ways. Moreover, to provide greater security of the management of a network device, it would be desirable to capture the identity of all persons who have the ability to manage the network device. Knowledge of what person has reconfigured a particular network device may help prevent unauthorized access that could compromise the security or integrity of a network.

SUMMARY OF THE INVENTION

Methods and devices are provided for role-based access control of network devices. In some embodiments, the network devices constitute the fabric of a storage area network ("SAN") that has been logically partitioned into virtual storage area networks ("VSANs"), which are allocated to various administrators. Roles assigned according to preferred aspects of the invention do not need to be hierarchical, but are customized according to administrators' needs. Some implementations of the invention allow the identification of the administrator who has invoked commands, e.g., to modify a device's configuration.

Some implementations of the invention provide a method of allocating commands to a plurality of administrators of a storage area network. The method includes the following steps: dividing a physical storage area network into a plurality of virtual storage area networks; defining a plurality of network command groups corresponding to non-hierarchical subsets of a set of commands for controlling network objects of the physical storage area network; and creating a customized role for an administrator of one of the plurality of virtual storage area networks by allocating at least one network command group to the administrator. Commands may include one or more keywords.

The method may also include the step of mapping a set of physical storage devices connected to the physical storage area network to a set of virtual storage objects, wherein the creating step further comprises the step of allocating to the administrator at least one virtual storage command group for controlling a virtual storage object. The creating step further may include the step of allocating to the administrator a storage command group for controlling at least one storage device. The customized role may permit the authorization of the administrator according to commands invoked by the administrator.

The method may also include the step of creating at least one additional customized role for the administrator. The customized role may include commands selected from a list of command groups consisting of a basic command group, an enable command group and an engineering command group, and wherein the customized role consists of fewer than the total number of commands of any command group. The commands of the network command groups may be allocated to each virtual storage area network of the plurality of virtual storage area networks and the customized role may consist of commands allocated to a single virtual storage area network.

The plurality of network command groups may be selected from the group consisting of a SHOW command group, an FSPF command group, a Zone command group and an FCDOMAIN command group. The commands of the command groups may be allocated to each virtual storage area network of the plurality of virtual storage area networks and the customized role may consist of commands allocated to some, but not all, of the virtual storage area networks.

According to some implementations, the customized role may include the SHOW command group and the FSPF command group, but not the ZONE command group. The customized role may include the SHOW command group and the FSPF command group, but not the ZONE command group.

Some embodiments of the invention provide a computer program for allocating commands to a plurality of administrators of a physical storage area network. The computer program causes at least one of the network devices in a fabric of the physical storage area network to perform the following steps: dividing the physical storage area network into a plurality of virtual storage area networks; defining a plurality of network command groups corresponding to non-hierarchical subsets of a set of commands for controlling network objects of the physical storage area network; and creating a customized role for an administrator of one of the plurality of virtual storage area networks by allocating at least one network command group to the administrator. Commands may include one or more keywords.

The computer program may map a set of physical storage devices connected to the physical storage area network to a set of virtual storage objects and the creating step may also include the step of allocating to the administrator at least one virtual storage command group for controlling a virtual storage object.

The creating step may include the step of allocating to the administrator a storage command group for controlling at least one storage device. The customized role may permit the authorization of the administrator according to commands invoked by the administrator.

The computer program may include the step of causing at least one of the network devices to create at least one additional customized role for the administrator. The customized role may include commands selected from a list of command groups consisting of a basic command group, an enable command group and an engineering command group and the customized role may consist of fewer than the total number of commands of any command group.

The plurality of network command groups may be selected from the group consisting of a SHOW command group, an FSPF command group, a Zone command group and an FCDOMAIN command group. The commands of the command groups may be allocated to each virtual storage area network of the plurality of virtual storage area networks and the customized role may consist of commands allocated to a single virtual storage area network.

The commands of the command groups may be allocated to each virtual storage area network of the plurality of virtual storage area networks and the customized role may consist of commands allocated to some, but not all, of the virtual storage area networks. According to one implementation, the customized role includes the SHOW command group and the FSPF command group, but not the ZONE command group. In another implementation, the customized role includes the SHOW command group and the FSPF command group, but not the ZONE command group.

Alternative embodiments of the invention provide a network device for allocating commands to a plurality of administrators of a storage area network. The network device is configured to perform the following steps: dividing a physical storage area network into a plurality of virtual storage area networks; defining a plurality of network command groups corresponding to non-hierarchical subsets of a set of commands for controlling network objects of the physical storage area network; and creating a customized role for an administrator of one of the plurality of virtual storage area networks by allocating at least one network command group to the administrator.

Alternative aspects of the invention provide a network device for allocating commands to a plurality of administrators of a storage area network. The network device includes: means for dividing a physical storage area network into a plurality of virtual storage area networks; means for defining a plurality of network command groups corresponding to non-hierarchical subsets of a set of commands for controlling network objects of the physical storage area network; and means for creating a customized role for an administrator of one of the plurality of virtual storage area networks by allocating at least one network command group to the administrator.

Yet other implementations of the invention provide a method of allocating commands to a plurality of administrators of a network. The method includes: dividing a physical network into a plurality of virtual networks; defining a plurality of network command groups corresponding to non-hierarchical subsets of a set of commands for controlling network objects of the physical network; and creating a customized role for an administrator of one of the plurality of virtual networks by allocating at least one network command group to the administrator. Commands may include one or more keywords.

Still other embodiments of the invention provide a network device for allocating commands to a plurality of administrators of a storage area network. The network device includes: means for dividing a physical network into a plurality of virtual networks; means for defining a plurality of network command groups corresponding to non-hierarchical subsets of a set of commands for controlling network objects of the physical network; and means for creating a customized role for an administrator of one of the plurality of virtual networks by allocating at least one network command group to the administrator.

BRIEF DESCRIPTION OF THE DRAWINGS

FIG. 5 is a table that further illustrates a non-hierarchical method for role-based access control.

FIG. 6 is a table that illustrates a method of assigning single or multiple roles to administrators.

DETAILED DESCRIPTION OF THE INVENTION

Figure 1:
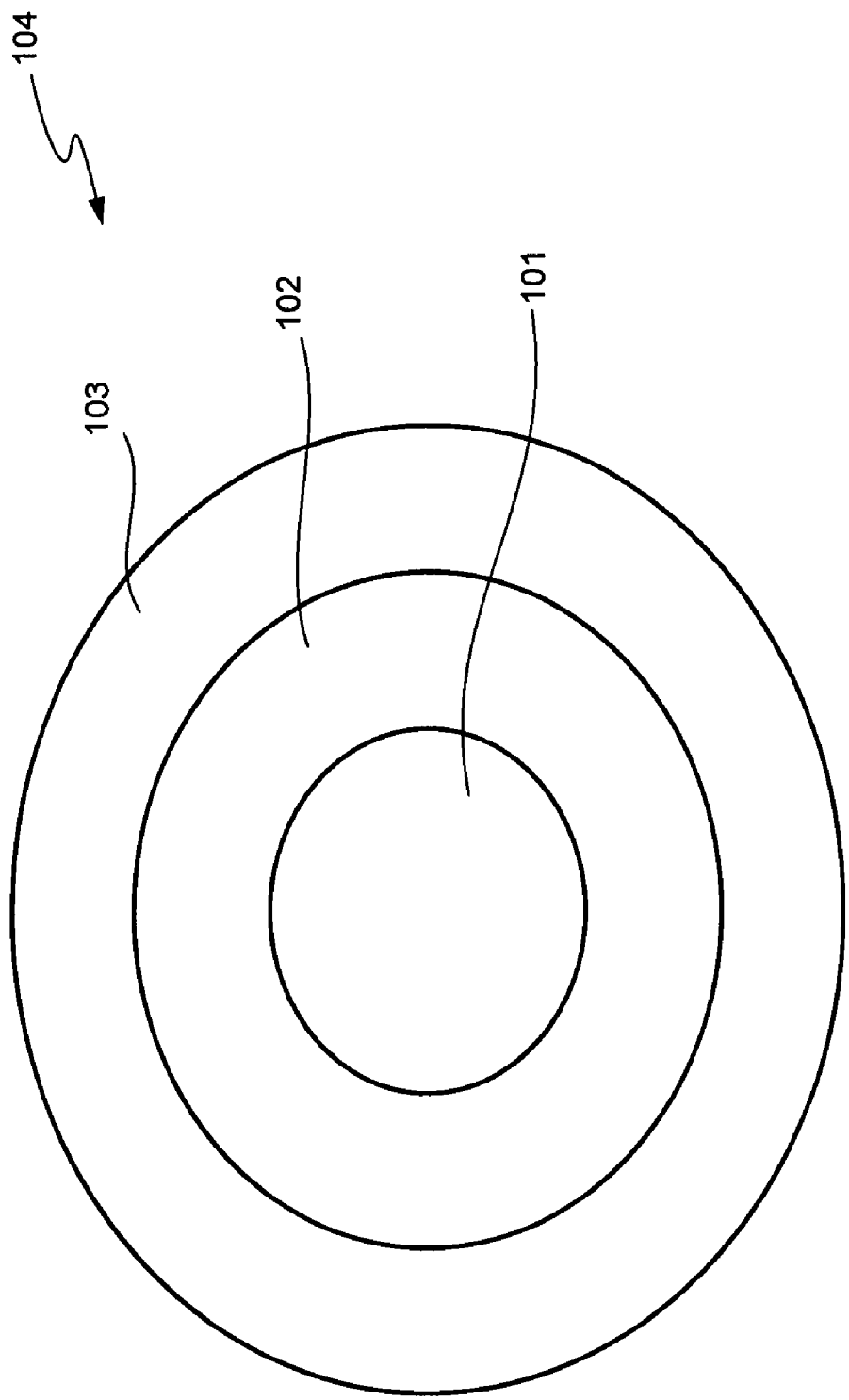
FIG. 1 illustrates a hierarchical model of assigning permissions for various commands.
Figure 1A:
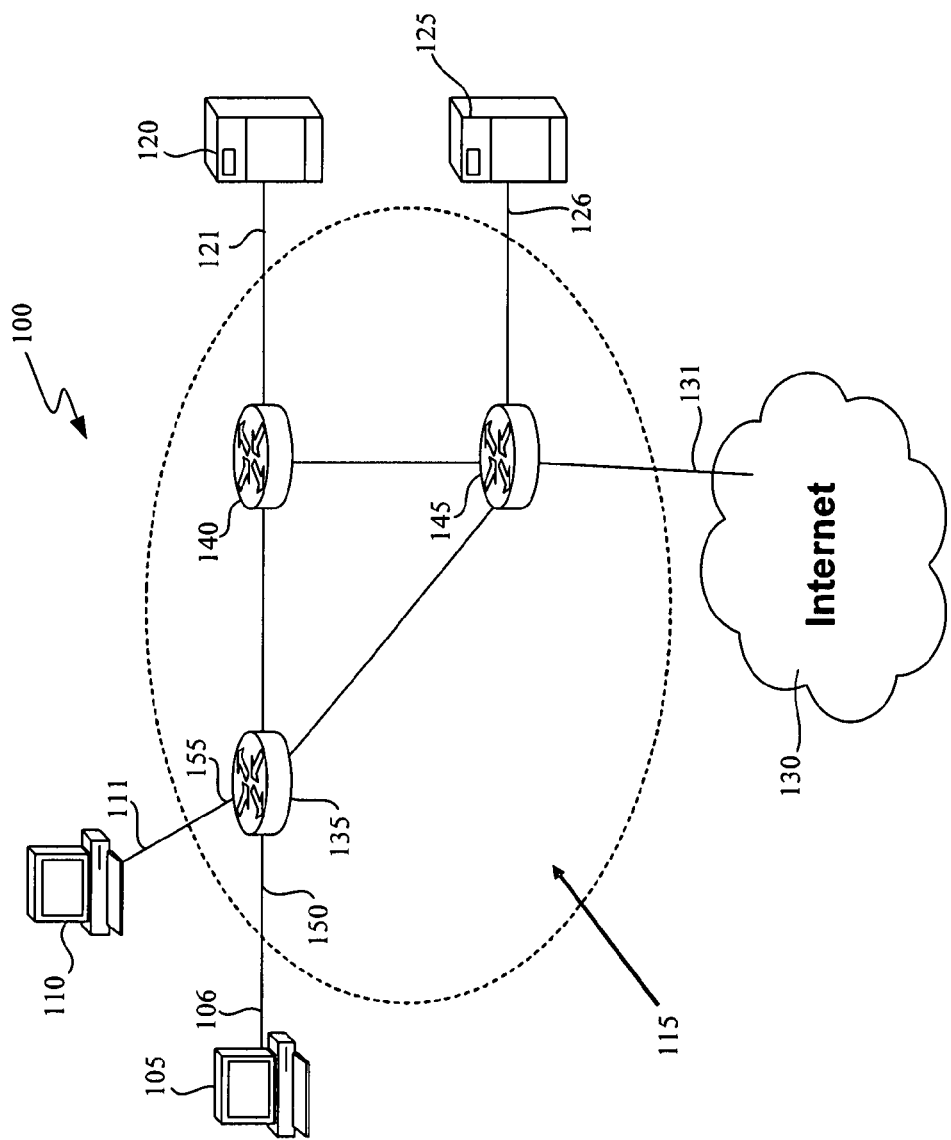
FIG. 1A illustrates a simplified version of a network that could be used to implement the present invention.

FIG. 1A depicts exemplary network 100 according to some embodiments of the present invention. According to some such embodiments, network 100 is a storage area network ("SAN"). According to preferred embodiments of the present invention, the physical components of network 100 define a SAN that has been partitioned into a plurality of virtual storage area networks ("VSANs"). VSANs are the subject of various patent applications assigned to Andiamo Systems, Inc. One such application is U.S. patent application Ser. No. 10/034,160, which is hereby incorporated by reference for all purposes.

Customers may use nodes 105 and 110 to communicate with storage device 120, storage device 125, Internet 130 or other networks via fabric 115. Nodes 105 and 110 may be host devices such as personal computers or any other convenient devices for interacting with fabric 115. Moreover, while only 2 nodes 105 and 110 are depicted in FIG. 1, any number of nodes may be connected to fabric 115. Here, for example, node 105 may represent a plurality of nodes used by a first customer (customer A) and node 110 may represent a plurality of nodes used by a second customer (customer B).

Storage devices 120 and 125 may represent physical storage devices of any type known in the art. Alternatively, storage devices 120 and 125 may represent "virtual" (a/k/a "logical") storage devices, which will be described in more detail below with reference to FIG. 3. Although only 2 storage devices are shown connected to fabric 115, any number of storage devices may be employed.

Network devices 135, 140 and 145 may be of any type known in the art, such as switches or routers. One such network device will be described below with reference to FIG. 9. As with the other components of network 100, only a minimal number of network devices have been shown for the sake of simplicity. However, many more network devices would be included in a typical fabric 115. In some preferred embodiments of the present invention, network devices 135, 140 and 145 are connected via optical fiber. In some embodiments, communication between these network devices is conducted via Fibre Channel ("FC") protocol.

As shown in FIG. 1A, network 100 may be connected to Internet 130, allowing nodes 105 and 110 to access other servers, storage area networks, etc.

Figure 2:
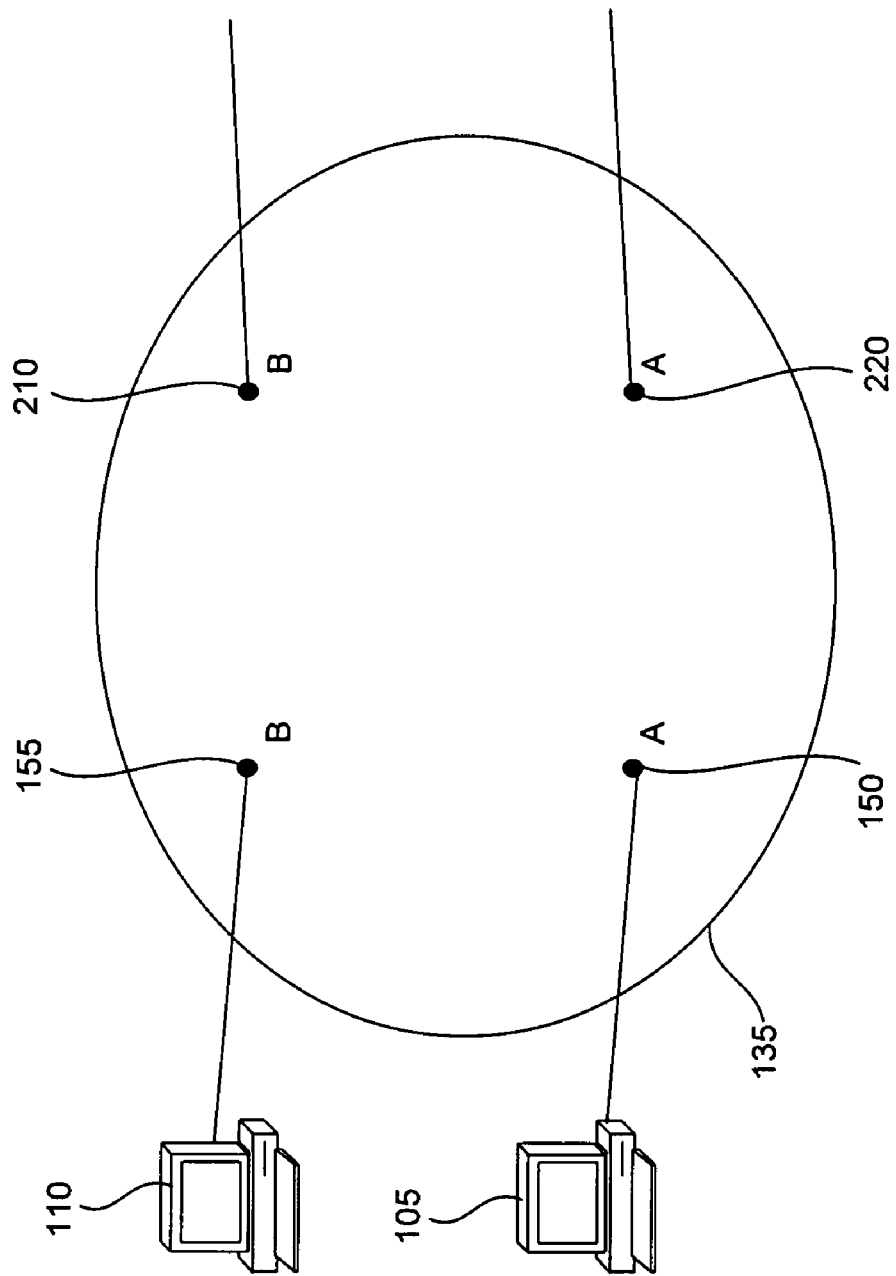
FIG. 2 illustrates a method of implementing VSANs.

FIG. 2 depicts one simplified method and apparatus for creating a VSAN based on SAN 100. Here, port 150 of network device 135 is connected to node 105, which is controlled by customer A. Accordingly, port 220 of network device 135 is also dedicated to use by customer A. Similarly, port 155 of network device 135 is connected to node 110, which is controlled by customer B. Corresponding port 210 of network device 135 is also dedicated to use by customer B. By separating the port designations as described above, the traffic through network device 135 by customers A and B can be physically segregated, though the same network device is used by customers A and B.

However, the methods and devices of the present invention may be used with any number of corresponding methods of creating or implementing VSANs, including those implementations in which a single port is configured to support multiple VSANs.

Figure 2A:
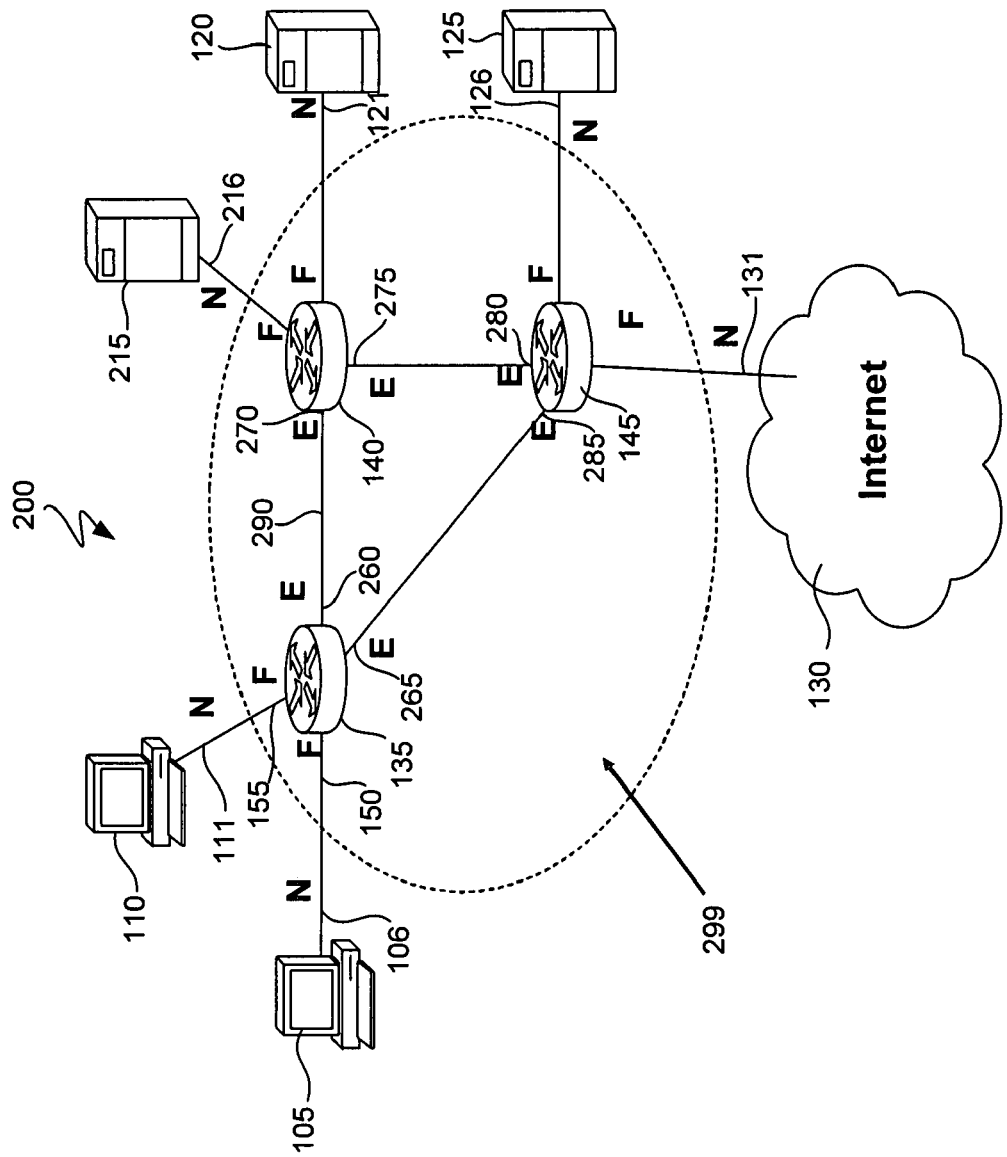
FIG. 2A illustrates another method of implementing VSANs.

FIG. 2A illustrates SAN 200, which is similar to network 100 of FIG. 1A. Nodes 105, 110, 215, 120 and 125 are connected to fabric 299 via ports 106, 111, 216, 121 and 126, respectively. Ports that connect network devices to nodes, such as ports 150 and 155 are known as "F ports" and are labeled as such in FIG. 2A. Ports that connect network devices to other network devices in the same fabric, such as ports 260 and 270, are known as "E ports" and are labeled accordingly in FIG. 2A. Links that connect E ports, such as link 290, are known as inter-switch links.

In order to allow multiple VSANs to share a single interswitch link on the underlying physical topology, the extended interswitch link ("EISL") protocol was developed at Andiamo Systems, Inc. See, for example, U.S. patent application Ser. No. 10/034,160, entitled "Methods and Apparatus for Encapsulating a Frame for Transmission in a Storage Area Network," Edsall, et al., filed Dec. 26, 2001, which is hereby incorporated by reference for all purposes. EISL provides an encapsulation mechanism for transporting packets between ports of different switches in a network on the basis of VSAN associations among those ports. Although the terms "frame" and "packet" may be accorded different meanings, these terms will be used interchangeably herein.

Accordingly, the E ports indicated in FIG. 2A may support multiple VSANs. For example, suppose VSAN 1 were assigned to customer A that controls node 105 and VSAN 2 were assigned to customer B that controls node 110. E port 260 could be configured to support both VSAN 1 and VSAN 2. In order to properly assign permissions regarding port 260, the authority to change parameters regarding VSAN 1 should be assigned to customer A and the authority to change parameters regarding VSAN 2 should be assigned to customer B. This is one example of an object (here, port 260) having multiple "roles," the access for which is granted in different forms to administrators depending on each administrator's role, as defined below.

Figure 3:
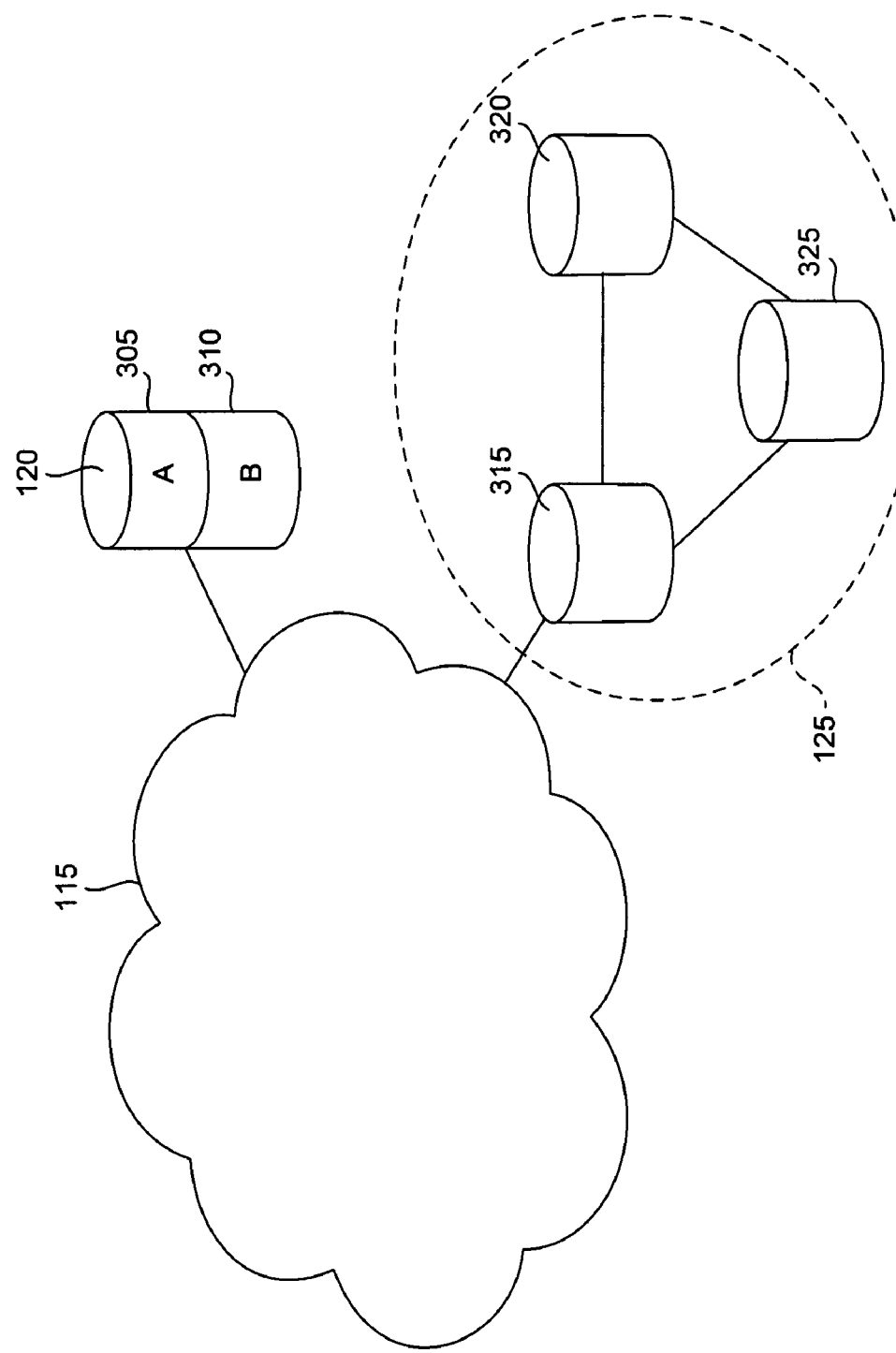
FIG. 3 illustrates the virtualization of storage devices.

FIG. 3 depicts the virtualization of storage devices 120 and 125. Here, physical storage device 120 has been divided into virtual storage devices 305 and 310. Virtual storage devices are also referred to herein as "storage objects" or "logical storage devices." In this example, virtual storage device 305 is accessible by customer A, but not by customer B. Virtual storage device 310 is accessible by customer B, but is not accessible by customer A. In this way, one physical storage device is mapped to 2 virtual storage devices. Although only 2 virtual storage devices are based upon physical storage device 120 in this example, any convenient number of virtual storage devices may be created in this manner.

FIG. 3 also depicts virtual storage device 125, which has been created by the aggregation of physical storage devices 315, 320 and 325. In this way, multiple physical storage devices may be mapped to the same logical storage device. According to some embodiments of the present invention, a redundant array of inexpensive disks ("RAID") may be used for such aggregations. As above, any convenient number of physical storage devices may be mapped to a single logical storage device.

Figure 4:
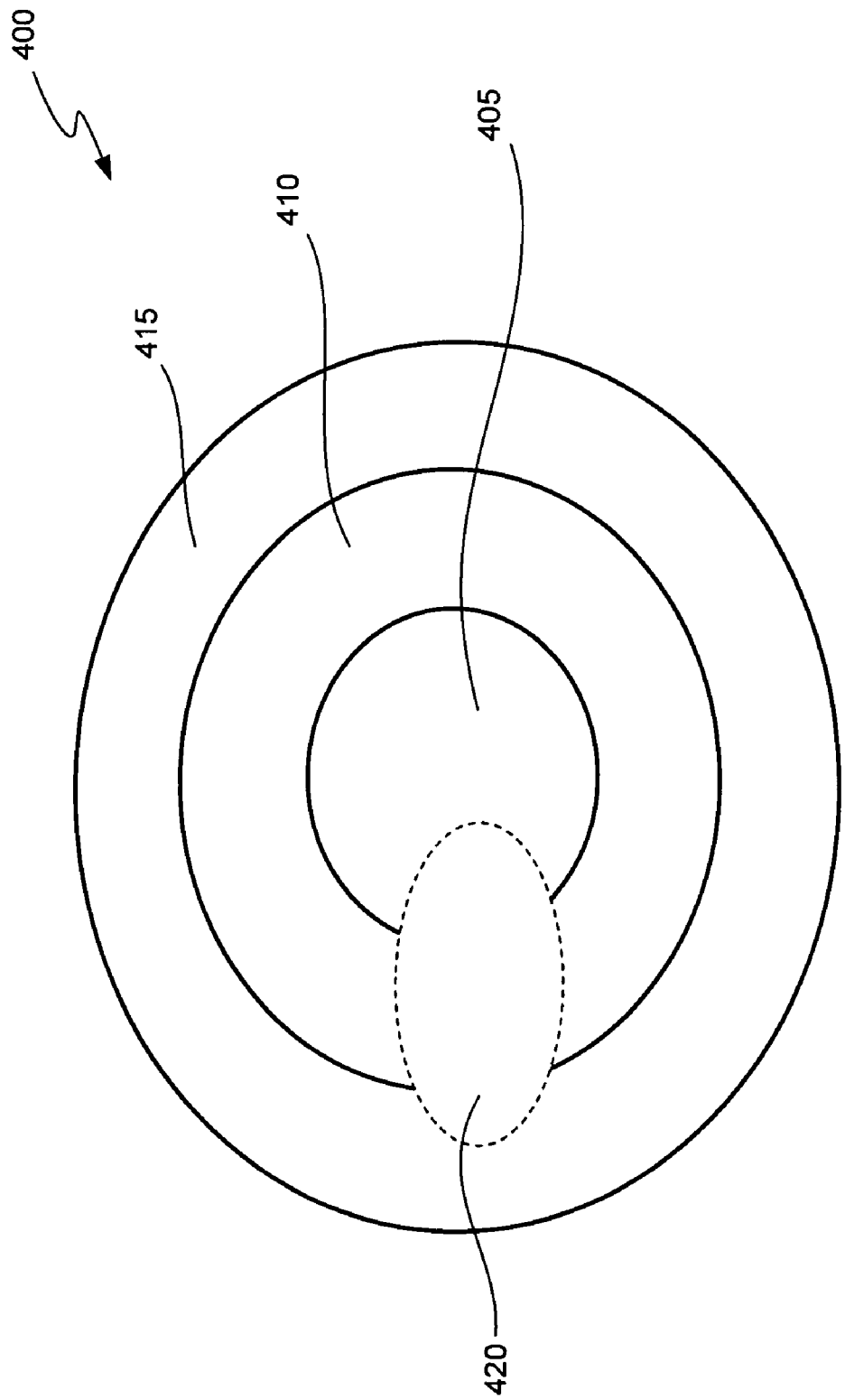
FIG. 4 illustrates a non-hierarchical method for role-based access control.

FIG. 4 is a diagram that distinguishes the hierarchical allocation of administrative permissions from the non-hierarchical allocation of such permissions according to some aspects of the present invention. Here, set 400 is the set of all commands that an administrator could potentially use to control the network devices within fabric 115.

As used herein, a "command" is a keyword or a series of keywords that define an action taken on "objects," which are representations of physical and virtual entities with which an administrator can interact. The word "object" is used in general when the context does not mandate the use of a particular entity. For example, an object may be a physical port, a logical port, a physical device, a virtual device, a VSAN, etc.

Command set 405 is a basic set of commands that would be allocated to a low-level administrator. Such commands would include a "show" command for determining configuration state of network devices in fabric 115 (or a portion of fabric 115).

Command set 410 is an "enable" set of commands, which could be assigned to a mid-level administrator. Command set 415 is an "engineering" set of commands, which could be assigned to the highest-level administrators of fabric 115.

As indicated by the "bulls eye" pattern, command set 400 has a hierarchical structure. Basic command set 405 is a subset of enable command set 410. Accordingly, administrators who have permission to use all commands within the enable command set 410 would also have permission to use all commands of basic command set 405. Similarly, enable command set 410 is a subset of engineering command set 415. Therefore, high-level administrators who may use commands in the engineering command set may also use any commands in the enable command set 410 or the basic command set 405.

According to some aspects of the present invention, a subset of commands 420 is defined as the set of commands associated with a customized role for assignment of privileges to network administrators. A "role" provides privileges to manipulate objects.

A set of available "actions," e.g., the commands of a computer program, may operate on various objects. A role describes which objects an administrator to whom the role is assigned may access and/or manipulate and which actions the administrator can perform on these objects.

In the example shown in FIG. 4, subset 420 includes some commands from the basic command set 405, enable command set 410 and engineering command set 415, but does not include all commands of any of those command sets. According to other aspects of the invention, subset 420 could include selected commands from the basic command set 405 and engineering command set 415, but not from enable command set 410. According to yet other embodiments of the invention, subset 420 could encompass commands from basic command set 405 and selected commands from enable command set 410, but not any commands from engineering command set 415.

FIG. 5 shows exemplary groupings of commands for subset 420 according to some aspects of the present invention. FIG. 5 is a table that depicts network command groups 505 and storage command groups 510 for particular VSAN. Network command groups 505 pertain to commands for controlling network objects, such as network devices or portions of network devices. As noted in FIG. 5, network command groups may apply to particular VSANs. Storage command groups 510 pertain to commands for controlling storage objects, e.g. storage device 120 or 125 of FIG. 3. For example, FIG. 5 could depict network command groups 505 and storage command groups 510 assigned to various levels of administrators for customer A. Other customers (e.g., Customer B) could have entirely different configurations of command subsets 420.

In the example shown in FIG. 5, network command groups 505 include Show command group 515, FSPF ("Fibre Channel shortest path first") command group 520, Zone command group 525 and FCDOMAIN command group 530. Corresponding storage command groups include storage command groups 535, 540 and 545. Such storage command groups may correspond, for example, to privileges for controlling and/or performing operations on physical or virtual storage devices that are made accessible to customer A. In some embodiments, a network command "group" or a storage command "group" may have only a single command.

According to some aspects of the invention, Show command group 515 includes at least a "show zone" command, for displaying zone information regarding a network device, and a "show fspf" command, for displaying global FSPF information. Information which may be displayed by using a "show fspf" command includes: the domain number of the network device; the autonomous region for the network device; the minimum time that must elapse before the network device accepts LSR updates; the minimum time that must elapse before the network device can transmit an LSR; the interval lapse between refresh LSR transmissions; and the maximum time an LSR can stay before being deleted.

Although the foregoing examples of commands included at most two keywords, roles restrictions can be used for commands with any number of keywords. For example, one role could have privileges for "show," another role could have privileges for "show fspf," another role could have privileges for "show fspf keyword3," yet another role could have privileges for "show fspf keyword3 keyword4" and so on. Accordingly, role restrictions can be accorded to commands with any number of keywords.

According to some aspects of the invention, FSPF command group 520 includes at least an "fspf config" command and an "fspf enable VSAN" command. An "fspf config" command is used to configure an FSPF feature for a VSAN, or to enable or disable FSPF. An "fspf enable VSAN" command enables fspf on an entire VSAN.

Related commands and subcommands include: "vsan id," for entering FSPF global configuration mode for a specified VSAN or range of VSANs; "region id," for defining the autonomous region to which a network device belongs (according to some aspects of the invention, the backbone region has a region id of zero); "spf hold-time," used to configure the time between two consecutive spf computations; "min-ls-arrival," used to configure the minimum time before a new link state update for a domain will be accepted by network device; and "min-ls-interval," used to configure the minimum time before a new link state update for a domain will be generated by a network device.

According to some aspects of the invention, Zone command group 525 includes at least a "zone name" command and a "zone default-zone" command. As used herein, the term "zone" means a collection of all terminals, gateways, and multipoint control units ("MCUs") managed by a single gatekeeper. A zone includes at least one terminal, and can include gateways or MCUs. A zone has only one gatekeeper. A zone can be independent of LAN topology and can be comprised of multiple LAN segments connected using routers or other devices.

A "zone name" command is used to create a zone. According to some aspects of the invention, there are various types of zone name commands and subcommands, including: "zone," the basic zone configuration command; "name," for naming a zone; "vsan," for configuring a zone on a VSAN; "number," the ID number of the VSAN; "member," used to add a member to a zone; "fcalias," used to add an FC alias to a zone; "fcid," for adding an FCID member to a zone; "fwwn," for adding a fabric port WWN member to a zone; "pwwn," for adding a port WWN member to a zone; and "no," used to negate a command or set its defaults.

A "zone default-zone" command is used to define whether a default zone (nodes not assigned a created zone) will permit or deny access to all in the default zone. According to some such aspects of the invention, the "no" form of this command is used to deny access.

According to some aspects of the invention, FCDOMAIN command group 530 includes at least a configuration for the "Domain Manager" daemon that controls the "Principal Switch Selection" protocol used in Fibre Channel (as defined in the FC-SW-2 standard). The Principal Switch is responsible for allocating Fibre Channel domain IDs for a fabric.

In this context, the "fcdomain priority" command defines the priority of a switch in a VSAN to be used at the time of principal switch selection, with 3 being the lowest and 254 being the highest in one example. The "fcdomain auto-reconfigure vsan" command enables an automatic reconfiguration option for a specified VSAN number. Similarly, the "fcdomain contiguous-allocation" command enables a contiguous allocation option for a specified VSAN. The "fcdomain domain" command allows configuration of the domain id and its type. The possible types are static and preferred.

The "fcdomain fabric name" command is for configuring the fabric name. The "fcdomain fcid database" commands are for configuring fcdomain persistent FCIDs and for entering a persistent FCID's submode. The "fcdomain persistent vsan" command enables or disables fcdomain persistent FCIDs and applies them to a VSAN.

The "fcdomain restart disruptive vsan" command forces a disruptive fabric reconfiguration option and applies the disruptive fabric reconfiguration to a VSAN. The "fcdomain restart vsan" command starts a disruptive or non-disruptive fabric reconfiguration and applies the disruptive or non-disruptive fabric reconfiguration to a VSAN.

In the example shown in FIG. 5, admin 550 is a high-level role that includes network command groups 515, 520, 525, and 530, as well as storage command group 535. However, even though all the possible commands within this allocation has been assigned to admin 550, this does not necessarily mean that all possible commands within, for example, engineering command group 415 would be available to admin 550. The entire set of commands may instead be comparable to command subset 420.

FSPF admin role 555 is a customized role that includes network command groups 515 and 520, but not network command groups 525 or 530. Role 555 also includes privileges to use storage command group 540. Similarly, the role created for Zone Admin 560 includes the ability to use all commands within network command groups 515 and 525, but not those of network command groups 520 or 530. Operator role 565 includes only those commands within network command group 515. In this example, the role of Operator 565 also includes privileges to use storage command group 545.

Customized role 570 includes the ability to use commands of network command groups 520 and 530, but not those of network command groups 515 or 525. In this example, customized role 570 includes the ability to use storage command group 535. Customized role 575 includes the ability to use commands of network command groups 515, 520 or 525. Moreover, the administrator or administrators to which this role is assigned would have the privilege to use storage command groups 540 and 545.

FIG. 6 depicts table 600, which illustrates the allocation of one role or of multiple roles to an individual administrator. In this example, Administrator 1 is assigned the role of FSPF Admin, whereas Administrator 2 is assigned both the FSPF Admin role and the Zone Admin role. In other embodiments, any convenient role combination may be assigned to an individual administrator.

Until now, the discussion has focused on the allocation of roles for a particular VSAN. However, according to some aspects of the invention, roles can be created for each VSAN of a physical network or, even more generally, for every object of a physical network, such as an interface.

Figure 7:
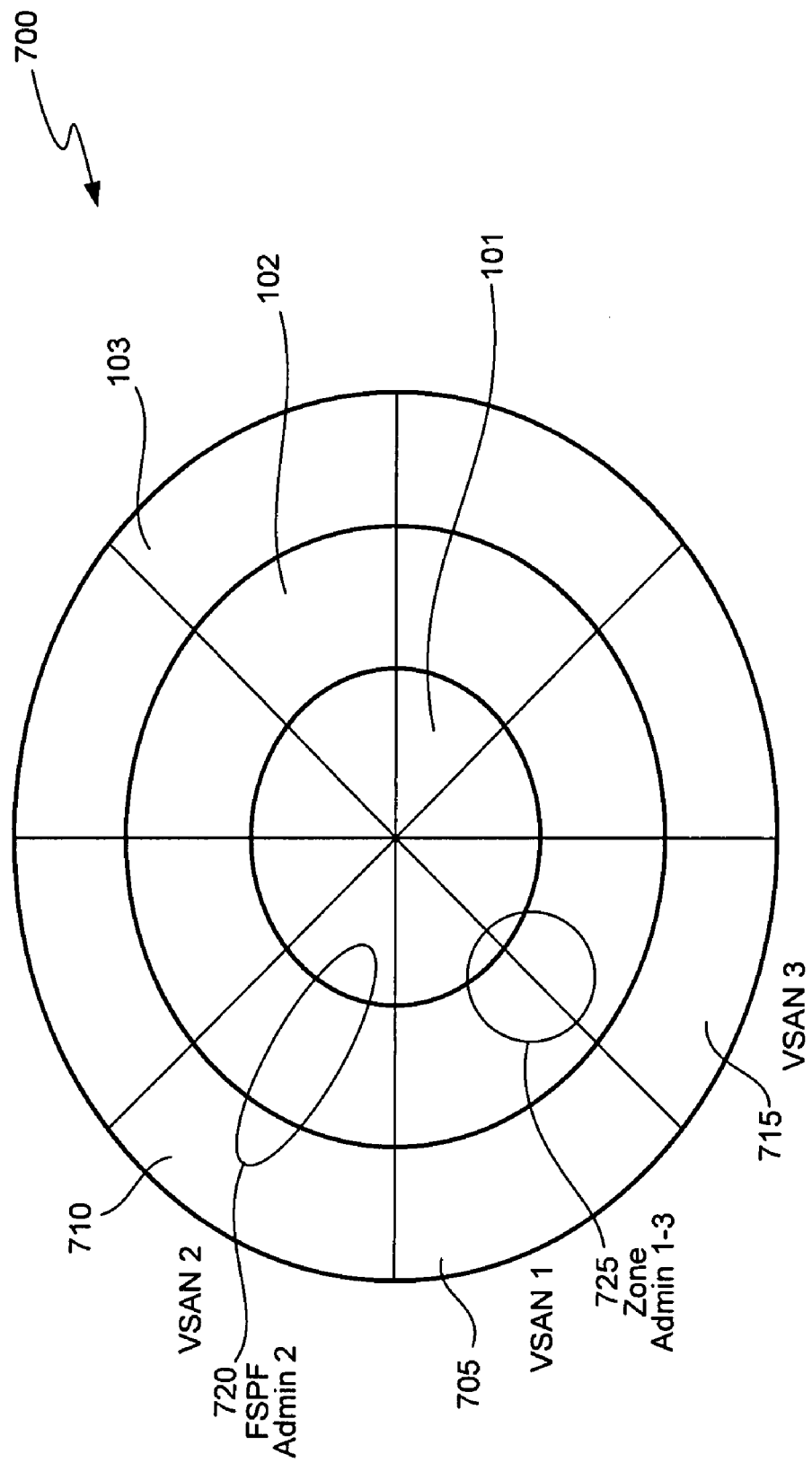
FIG. 7 illustrates another non-hierarchical method for role-based access control.

According to other aspects of the invention, roles can be created which pertain to more than one VSAN. Some such aspects are depicted in FIG. 7. Command groups 101, 102 and 103 are shown as before. However, pie slices 705, 710 and 715 represent sectors of command set 700 that are allocated to VSAN 1, VSAN 2 and VSAN 3, respectively. Although only a total of 8 pie slices are depicted in FIG. 7, the total number of possible VSANs may be lower or much higher.

Role 720 is an FSPF Admin role pertaining to VSAN2. In this example, FSPF Admin role 720 includes commands from command groups 101, 102 and 103. However, FSPF Admin role 720 includes only some of the commands within pie slice 710 and does not include any commands from other areas of command set 700.

Role 725 is a Zone Admin role that spans pie slices 705 and 715, and therefore includes commands pertaining to VSAN1 and VSAN3, respectively. Such a configuration would be useful, for example, in situations wherein a single customer controls both VSANs 1 and 3. In this example, Zone Admin role 725 includes commands from command group 101 and 102, but not from command group 103.

Figure 8:
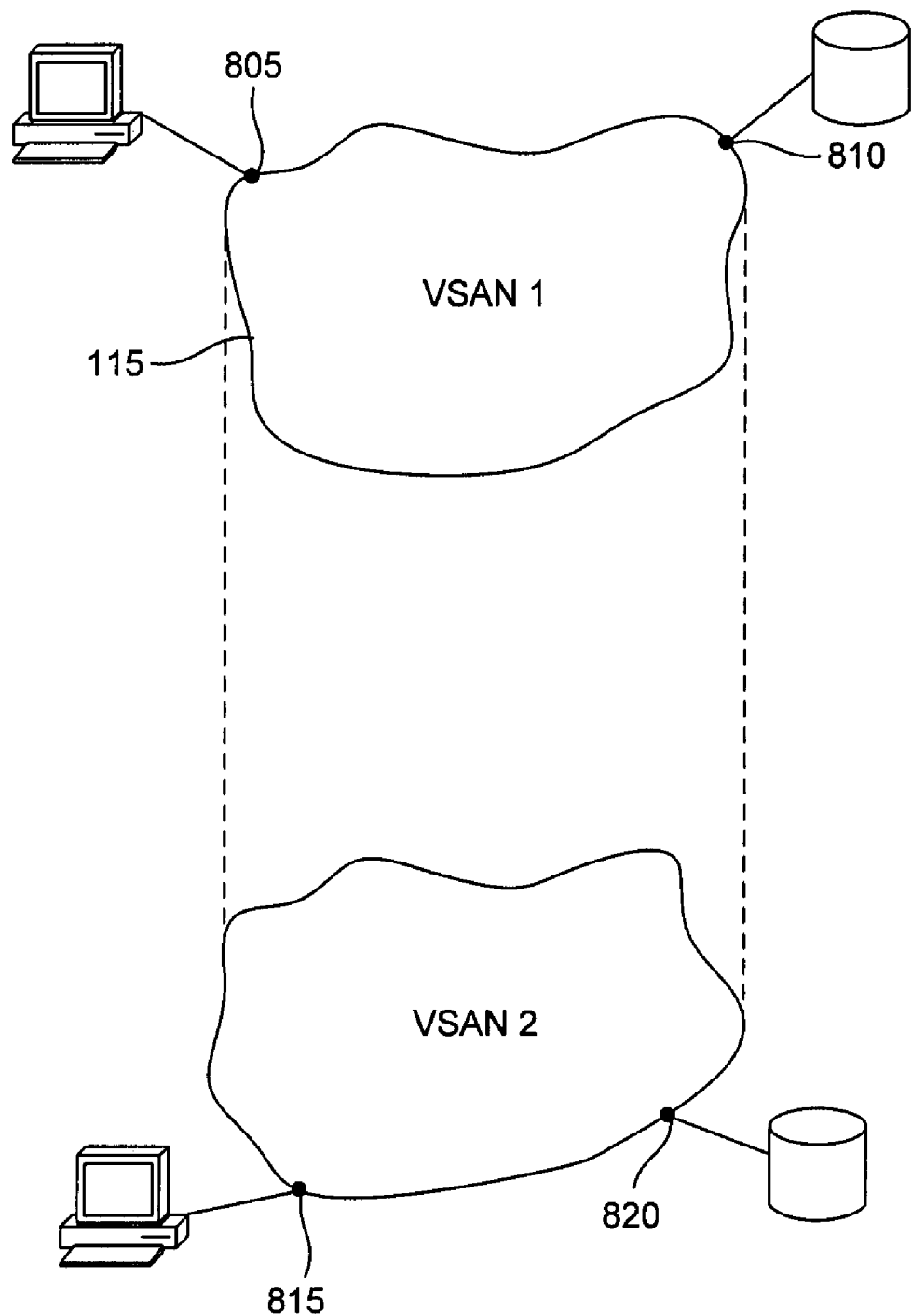
FIG. 8 illustrates still another method for role-based access control.

FIG. 8 depicts a still finer granularity of role-based access control, wherein role-based access control is provided for one or more individual network devices of fabric 115. VSAN 1 is allocated to Customer A. VSAN 1 includes ports 805 and 810 of network devices within fabric 115. In this example, roles are defined that pertain only to ports 805 and 810. Such roles may be any of those described above with reference to FIGS. 5 through 7, or the roles may be other customized roles. In other embodiments of the invention, roles are defined for larger numbers of ports within VSAN 1.

VSAN 2 is allocated to Customer B. VSAN 2 includes ports 815 and 820 of network devices within fabric 115. In this example, roles are defined that pertain only to a single port, e.g., port 815 or 820. Such roles may be any of those described above with reference to FIGS. 5 through 7, or the roles may be other customized roles. In yet other embodiments, roles are defined for specific ports (or groups of ports) that service more than one VSAN.

Figure 9:
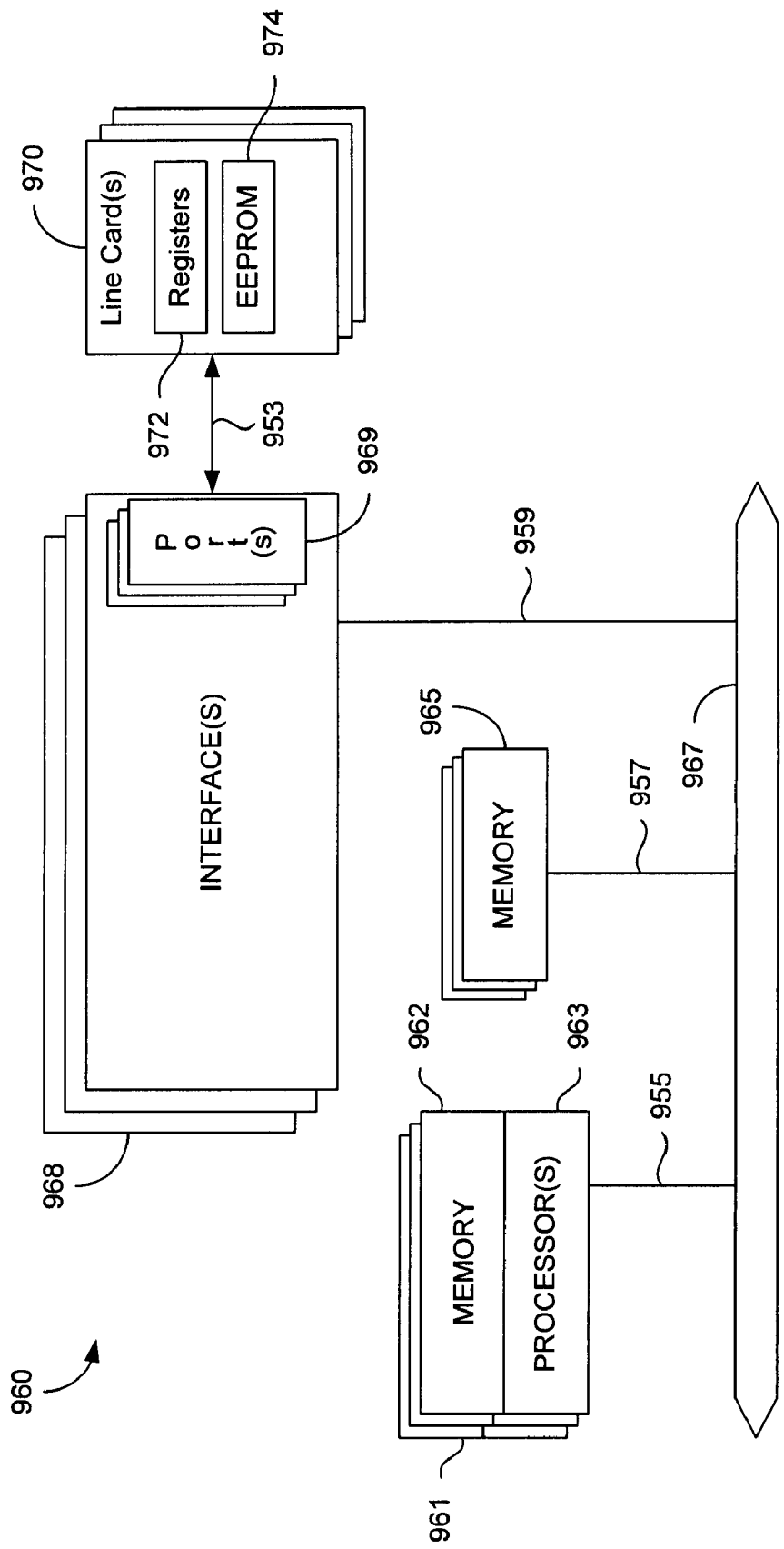
FIG. 9 illustrates a network device that may be configured for role-based access control.

Referring now to FIG. 9, a network device 960 suitable for implementing the techniques of the present invention includes a master central processing unit (CPU) 962, interfaces 968, and a bus 967 (e.g., a PCI bus). When acting under the control of appropriate software or firmware, the CPU 962 may be responsible for implementing specific functions associated with the functions of a desired network device. For example, when configured as an intermediate router, the CPU 962 may be responsible for analyzing packets, encapsulating packets, and forwarding packets. The CPU 962 preferably accomplishes all these functions under the control of software including an operating system (e.g. Windows NT), and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

The interfaces 968 are typically provided as interface cards (sometimes referred to as "line cards"). Generally, they control the sending and receiving of data packets over the network and sometimes support other peripherals used with the network device 960. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 962 to efficiently perform routing computations, network diagnostics, security functions, etc.

Although the system shown in FIG. 9 illustrates one specific network device of the present invention, it is by no means the only network device architecture on which the present invention can be implemented. For example, an architecture having a single processor that handles communications as well as routing computations, etc., is often used. Further, other types of interfaces and media could also be used with the network device.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application.

For example, this invention is not limited to storage networking infrastructures as those depicted herein, but can be applied to all data networking infrastructures consisting of related networking services embodied in common networking devices. Other examples include the application of role-based access control within IP and Ethernet networking devices such as routers and LAN switches that incorporate network services such as firewall services, intrusion detection, server load balancing, and content caching.

In addition, this invention can be applied to networking infrastructures that consist of virtual sub-systems of connectivity and services of which a user may apply roles-based access control. An example of such a sub-system is the depiction of VSANs within this proposal. A data networking example of such a sub-system of connectivity and services involves the application of role-based access control to a LAN infrastructure consisting of multiple virtual LANs (VLANs).

Accordingly, the present embodiments are to be considered as illustrative and not restrictive, and the invention is not to be limited to the details given herein, but may be modified within the scope and equivalents of the appended claims.

We claim:

1. A method of allocating commands to a plurality of administrators of a storage area network, the method comprising:
    dividing a physical storage area network into at least a first virtual storage area network and a second virtual storage area network;
    defining a plurality of network command groups corresponding to non-hierarchical subsets of a set of commands for controlling network objects of the physical storage area network;
    creating a first customized role for a first administrator for controlling the first virtual storage area network by allocating a first set comprising at least one network command group to the first administrator, wherein the first set includes a SHOW command group; and
    creating a second customized role for a second administrator controlling the second virtual storage area network by allocating a second set comprising at least one network command group to the second administrator.

2. The method of claim 1, further comprising the step of mapping a set of physical storage devices connected to the physical storage area network to a set of virtual storage objects, wherein the creating step further comprises the step of allocating to the first administrator at least one virtual storage command group for controlling a virtual storage object.

3. The method of claim 1, wherein the creating step further comprises the step of allocating to the first administrator a storage command group for controlling at least one storage device.

4. The method of claim 1, wherein the first customized role permits the authorization of the first administrator according to commands invoked by the first administrator.

5. The method of claim 1, further comprising the step of creating at least one additional customized role for the first administrator.

6. The method of claim 1, wherein the first customized role comprises commands selected from a list of command groups consisting of a basic command group, an enable command group and an engineering command group, and wherein the first customized role consists of fewer than the total number of commands of any command group.

7. The method of claim 1, wherein the plurality of network command groups is selected from the group consisting of a SHOW command group, an FSPF command group, a Zone command group and an FCDOMAIN command group.

8. The method of claim 1, wherein commands comprise one or more keywords.

9. The method of claim 6, wherein commands of the network command groups are allocated to each virtual storage area network and wherein the first customized role consists of commands allocated to the first virtual storage area network.

10. The method of claim 6, wherein commands of the command groups are allocated to each virtual storage area network, and wherein the first customized role consists of commands allocated to some, but not all, of the virtual storage area networks.

11. The method of claim 7, wherein the customized role comprises the SHOW command group and the FSPF command group, but does not include the ZONE command group.

12. A computer readable medium having stored thereon a computer program for allocating commands to a plurality of administrators of a physical storage area network, the computer program causing at least one of the network devices in a fabric of the physical storage area network to perform the following steps:
    dividing the physical storage area network into at least a first virtual storage area network and a second virtual storage area network;
    defining a plurality of network command groups corresponding to non-hierarchical subsets of a set of commands for controlling network objects of the physical storage area network;
    creating a first customized role for a first administrator for controlling the first virtual storage area network by allocating a first set comprising at least one network command group to the first administrator, wherein the first set includes a SHOW command group; and
    creating a second customized role for a second administrator controlling the second virtual storage area network by allocating a second set comprising at least one network command group to the second administrator.

13. The computer readable medium of claim 12, wherein the computer program further maps a set of physical storage devices connected to the physical storage area network to a set of virtual storage objects, wherein the creating step further comprises the step of allocating to the first administrator at least one virtual storage command group for controlling a virtual storage object.

14. The computer readable medium of claim 12, wherein the creating step further comprises the step of allocating to the first administrator a storage command group for controlling at least one storage device.

15. The computer readable medium of claim 12, wherein the first customized role permits the authorization of the first administrator according to commands invoked by the first administrator.

16. The computer readable medium of claim 12, further comprising the step of causing at least one of the network devices to create at least one additional customized role for the first administrator.

17. The computer readable medium of claim 12, wherein the first customized role comprises commands selected from a list of command groups consisting of a basic command group, an enable command group and an engineering command group, and wherein the first customized role consists of fewer than the total number of commands of any command group.

18. The computer readable medium of claim 12, wherein the plurality of network command groups is selected from the group consisting of a SHOW command group, an FSPF command group, a Zone command group and an FCDOMAIN command group.

19. The computer readable medium of claim 12, wherein commands comprise one or more keywords.

20. The computer readable medium of claim 17, wherein commands of the command groups are allocated to each virtual storage area network and wherein the first customized role consists of commands allocated to the first virtual storage area network.

21. The computer readable medium of claim 17, wherein commands of the command groups are allocated to each virtual storage area network and wherein the first customized role consists of commands allocated to some, but not all, of the virtual storage area networks.

22. The computer readable medium of claim 17, wherein the first customized role comprises the SHOW command group and the FSPF command group, but does not include the ZONE command group.

23. A network device for allocating commands to a plurality of administrators of a storage area network, the network device configured to perform the following steps:
dividing a physical storage area network into at least a first virtual storage area network and a second virtual storage network;
defining a plurality of network command groups corresponding to non-hierarchical subsets of a set of commands for controlling network devices of the physical storage area network, wherein each network device is a router or a switch;
creating a first customized role for a first administrator of the first virtual storage area network by allocating a first set comprising at least one network command group to the first administrator, the first set including a command relating to identifying a route of a plurality of routes between a first and second network device of the first virtual storage area network; and
creating a second customized role for a second administrator of a second virtual storage area network by allocating a second set comprising at least one network command group to the second administrator.

24. A network device for allocating commands to a plurality of administrators of a storage area network, the network device comprising:
means for dividing a physical storage area network into at least a first storage area network and a second storage area network;
means for defining a plurality of network command groups corresponding to non-hierarchical subsets of a set of commands for controlling network devices of the physical storage area network, wherein each network device is a router or a switch;
means for creating a first customized role for a first administrator of the first virtual storage area network by allocating a first set comprising at least one network command group to the first administrator, the first set including a command relating to identifying a route of a plurality of routes between a first and second network device of the first virtual storage area network; and
means for creating a second customized role for a second administrator of a second virtual storage area network by allocating a second set comprising at least one network command group to the second administrator.

25. A method of allocating commands to a plurality of administrators of a network, the method comprising:
dividing a physical network into at least a first virtual network and a second virtual network;
defining a plurality of network command groups corresponding to non-hierarchical subsets of a set of commands for controlling network devices of the physical network, wherein each network device is a router or a switch;
creating a first customized role for a first administrator of the first virtual network by allocating at least one network command group to the first administrator; and
creating a second customized role for a second administrator of the second virtual network by allocating at least one network command group to the second administrator.

26. A network device for allocating commands to a plurality of administrators of a storage area network, the network device comprising:
means for dividing a physical network into at least a first virtual network and a second virtual network;
means for defining a plurality of network command groups corresponding to non-hierarchical subsets of a set of commands for controlling network devices of the physical network wherein each network device is a router or a switch;
means for creating a first customized role for a first administrator of the first virtual network by allocating at least one network command group to the first administrator; and
means for creating a second customized role for a second administrator of the second virtual network by allocating at least one network command group to the second administrator.

27. A method of allocating commands to a plurality of administrators of a storage area network, the method comprising:
dividing a storage area network into at least a first virtual storage area network and a second virtual storage area network, wherein the first virtual storage area network and the second virtual storage area network share at least an interswitch link via Extended Interswitch Link (EISL) Protocol;

defining a plurality of network command groups corresponding to non-hierarchical subsets of a set of commands for controlling at least the first physical device;

creating a first administrator role for controlling the first virtual storage area network by allocating at least one network command group to the first administrator role;

creating a second administrator role for controlling the second virtual storage area network by allocating at least one network command group to the second administrator role.

* * * * *